United States Patent [19]

Glasziou et al.

[11] 3,875,009

[45] Apr. 1, 1975

[54] BIOLOGICAL PRODUCTS

[75] Inventors: Kenneth Trevor Glasziou, Indooroopilly, Queensland, Australia; Charles Roger Slack, Edinburgh, Scotland

[73] Assignee: The Colonial Sugar Refining Company Limited, Sydney, New South Wales, Australia

[22] Filed: July 20, 1973

[21] Appl. No.: 381,171

[30] Foreign Application Priority Data

July 28, 1972 Australia............................ 9884/72

[52] U.S. Cl. .................................. 195/65
[51] Int. Cl............................................. C12d 13/10
[58] Field of Search ......... 195/62, 65, 66 R; 424/50

[56] References Cited
UNITED STATES PATENTS

| | | | |
|---|---|---|---|
| 3,702,805 | 11/1972 | Ishibashi et al. ................. | 195/66 R |
| 3,737,383 | 6/1973 | Abe et al. ............................. | 195/62 |
| 3,787,289 | 1/1974 | Davis et al. .......................... | 195/65 |

*Primary Examiner*—Lionel M. Shapiro
*Attorney, Agent, or Firm*—Hyman F. Glass; Emory L. Groff, Jr.

[57] ABSTRACT

Method of producing dextranase by cultering a dextranase-producing strain of the fungus *Fusarium fusarioides*, for example, *Fusarium fusarioides* I.M.I. No. 158,405, *Dactylium fusarioides* A.T.C.C. No. 14167, *Fusarium chlamydosporum* C.B.S. No. 145.25, *Fusarium roseum* A.T.C.C. No. 13379, and *Fusarium tricinctum* C.B.S. No. 261.51, or a mutant or variant of said strain, in a fermentation medium, and recovering the dextranase which accumulates therein.

34 Claims, No Drawings

BIOLOGICAL PRODUCTS

This invention relates to the preparation of a dextranase (i.e. an enzyme capable of degrading dextran) from a fungus which has not hitherto been used for this purpose — and is in fact predicated upon our discovery that such fungus can be used in the production of dextranase. More particularly, the invention provides a method of preparing the dextranase by culturing dextranase-producing strains of the fungus *Fusarium fusarioides*.

The fungus *Fusarium fusarioides* has certain identifiable characteristics. Thus, it is in no way fastidious and is able to grow on a variety of media; however, for maximum efficacy in identification, the potato sucrose agar medium described by Gordon (Canad. J. Bot. 30, 209–251, (1952)) is employed. The culture grows rapidly, producing a white mycelium which later baecomes a coral, red to bay, colour (this later stage of colour is generally affected by the composition of the selected nutrient medium — and in particular, it is affected by those media rich in iron or zinc.). The growth rate is 3.5 cm; and the colony appears dry and powdery from above, with cottony mycelium. The colour darkens after about 10 days and brown walled chlamydospores are formed.

The blastophoric microconidia are dry, and fusiform to clavate in shape with a rounded apex. Their size is 3–5 $\mu$ by 12–15 $\mu$ and they remain separate without clumping. They usually become 1 septate, and have a basal scar. On the other hand the macroconidia are curved and sickle shaped with a pointed apex and a marked foot cell.

Their size is between 40–57 $\mu$ by 5–6 $\mu$ and they are 4–6 septate.

After 10–14 days, large globose chlamydospores are developed. They are often seen at the end of lateral branches. They can form cross septa or can proliferate as long chains (50 $\mu$). The wall of a mature chlamydospore turns brown.

As is well know (vide "the Genus Fusarium" by C. Booth published by Commonwealth Agricultural Bureaux England 1971 at pages 80–98), the nomenclature of some of the fungi of the genus Fusarium presents considerable difficulties — and it is recognised that the fungus mentioned has been described hitherto in alternative ways, for example as *Fusarium avenaceum*, *Fusarium chlamydosporum*, *Fusarium roseum*, *Fusarium tricinctum*, *Dactylium fusarioides* or *Gibberella avenacea*. Dextranase-producing strains so designated are included within the ambit of the invention — and where convenient hereafter, the fungus which is subject of the invention will be simply referred to as "the subject organism" or simply as "the organism".

Dextranases have been prepared hitherto by culturing various strains of fungi such as *Pencillium funiculosum*, *Pencillium lilacinum* and *Spicaria violacea*, but the yields per millilitre of culture medium, measured in units of dextranase activity; have been low.

The Unit of dextranase activity is defined herein as the number of micromoles of reducing groups which are released per minute per millilitre of cell free culture medium, determined at optimum temperature and pH in a standard solution containing the dextranase and dextran, the dextranase being introduced as a diluted supernatant liquid of centrifuged culture medium, and the dextran being present in proportions such that its concentration is not limiting (i.e. pseudo first-order kinetics obtain). For the purpose of this definition, the reducing groups released are assayed by the method reported by G. L. Miller, R. Blum, W. E. Glennon, and A. L. Burton in Analytical Biochemistry 1, 127 (1960)).

Considerable differences in dextranase yield are observed with cultures of different strains of the subject organism. It is a particular advantage of the present invention that some of the strains thereof can be cultured to give yields of the order of 150–250 Units per millilitre of centrifuged culture medium.

As used herein, a "dextranase-producing strain" of the organism is defined as one that can be cultured in a suitable fermentation medium to give a satisfactory yield of dextranase. In the performance of our invention, a satisfactory yield of dextranase has been found to be a yield of at least 5 Units per millilitre of centrifuged culture medium.

It is recognised that the ability of an organism to secrete an enzyme when cultured in a suitable aqueous nutrient medium can be altered markedly by inducing genetic mutations therein by treatment with mutagenic chemicals or by irradiation with ultraviolet or with X- or $\gamma$-radiation. It will be understood therefore, that any given strain of the subject organism which does not naturally conform to the above definitional requirements of a dextranase-producing strain, can be regarded as a candidate for mutagenic alternation which can transform it into a strain which does meet the definitional requirements.

In its broadest aspect the invention provides a method of producing dextranase which comprises culturing a dextranase-producing strain of the fungus *Fusarium fusarioides*, or a mutant or variant of the said strain, in a fermentation medium; and recovering the dextranase which accumulates therein. In a further more specific aspect, the invention provides a method of producing dextranase which comprises culturing, in a fermentation medium, a dextranase-producing strain of the fungus *Fusarium fusarioides*, or a mutant or variant of the said strain, the said strain being selected from those herein after specifically named and described as dextranase-producing; and recovering the dextranase which accumulates therein. The invention also included within its ambit the product dextranase as so produced.

Samples of the *Fusarium fusarioides* dextranase-producing strains have been deposited by the applicant under I.M.I. No. 158405 in the culture collection of the Commonwealth Mycological Institute; deposited strains of the organism from other sources which have now been shown by us to be dextranase-producing are, for example *Dactylium fusarioides* American Type Culture Collection (A.T.C.C.) No. 14167, *Fusarium chlamydosporum* Centraalbureau voor Schimmelcultures (C.B.S.) No. 145.25, *Fusarium roseum* A.T.C.C. No. 13379, and *Fusarium tricinctum* C.B.S. No. 261.51. On the other hand, deposited strains of the organism from other sources which have been shown by the applicant not to be dextranase-producing (i.e. as defined herein) include *Dactylium fusarioides* A.T.C.C. No. 16568, *Fusarium chlamydosporum* A.T.C.C. No. 15615, *Fusarium roseum* A.T.C.C. No. 14717, and *Gibberella avenacea* A.T.C.C. No. 18185. It is reiterated that production of dextranase is determinable in accordance with the afore mentioned method of Miller et al.

In carrying out the invention, in accordance with the best method of performance thereof, and aqueous nutrient fermentation medium is inoculated with germinating spores of the organism and the culture is then incubated under aerated conditions at a suitable temperature and pH. Typically, the temperature is selected within the range of 25°C to 30°C and the pH varies between 6.5 and 7.8. Preferably, the temperature is controlled at about 30°C and the pH is not allowed to rise above 7.8.

As is well known, the optimum period (i.e. the period required for producing the maximum yield of enzyme) for an incubation of the type in question is dependant, for example, on the nature and state of germination of the selected organism, the conditions of aeration and mixing, the composition of the nutrient medium, and the values selected for the temperature and pH. Typical optimum periods in the practice of the present invention may vary from about 50 hours (when mixing in a fermentation tank) to about 280 hours (when using a shake flask for mixing).

The incubation is carried out in an aerated sterile aqueous nutrient medium of conventional type containing sources of conventional minerals, nitrogen, and of assimilable carbon, the latter also comprising a suitable dextranase inducer, preferably dextran.

Specifically, the following medium is suitable

| Component | % by weight |
| --- | --- |
| Dextran | 4.0 |
| Malt extract (80% solids) | 0.5 |
| Biotin | 0.0001 |
| Iron "sequestrene" (Geigy) | 0.006 |
| $KH_2PO_4$ | 0.15 |
| $MgSO_4.7H_2O$ | 0.15 |
| KCl | 0.15 |
| $NaNO_3$ | 0.60 |
| Water | to make 100.00 |

It will be understood that the components of the nutrient medium can be varied within known conventional limits, and that the concentrations in which they are present can similarly be varied. By way of illustration, the above medium can be varied by including dextran, for example, in 2% instead of 4% concentration; the malt extract can comprise, for example, 10% instead of 80% solids; the malt extract can be replaced, either in part or whole, by any one of, or a mixture of, for example: yeast extract, corn steep liquor and hydrolyzed casein; there can be supplemental additions of any one of, or a mixture of, for example: sugars such as sucrose, glucose and fructose; and the sodium nitrate can be advantageously replaced, for example, by urea as an alternative source of nitrogen.

Such variations, together with variations in the mineral composition of the examplified medium, are well known in the art and are not further elaborated.

In the absence of control, the pH of the medium changes naturally during incubation of a final value of about 8.5. As such a high pH may be detrimental to the production of dextranase, it is preferable, therefore, to maintain a lower pH such as 7.8 during the incubation period. Standard techniques of pH control can be employed for this purpose.

To provide oxygen for growth of the organism, the culture medium should be aerated during the incubation period. At least during the logarithmic growth phase, the concentration of dissolved oxygen in the culture medium should, for optimum effectiveness, be maintained between 20% and 30% of saturation — and this can be achieved conveniently with an aeration rate of between 0.5 and 1 litre of air per minute per litre of medium.

Suitably, at least when using a fermentation tank, the dissolved oxygen level can be monitored by means of a dissolved oxygen meter — and the latter can be caused to control the aeration rate as required by initiating a change in the degree of stirring of the medium or a change in the rate of air flow through the medium. Should either of these methods of aeration control lead to the production of excessive foam, the situation can be rectified by use of a mechanical foam breaker, or alternatively the foam can be suppressed by a judicious addition of an antifoaming agent.

When measurements indicate that a maximum concentration of dextranase has been reached in the culture medium, the aeration is stopped and the temperature is lowered to about 15°C. Since the dextranase is secreted extracellularly by the organism, it accumulates in, and is conveniently recoverable in, the supernatant liquid obtained by centrifuging the culture medium. This supernatant liquid may then be concentrated by other means, for example, it can be concentrated by (i) salting out with ammonium sulphate or (ii) applying reverse osmosis techniques. In another acceptable method (iii) it (the supernatant liquid) can be first de-salted by standard means, and the enzyme then precipitated by adding cold acetone or alcohol.

The dextranase produced according to the invention has a molecular weight of about 40,000. Accordingly, passage of the supernatant liquid from the culture medium over a reverse osmosis membrane selective for molecular weights above about 20,000 allows effective concentration according to method (ii) without loss of enzyme. The reverse osmosis concentrated fluid may be used as such, or may be purified further. Low temperature evaporation of the water from the concentrated fluid leaves a pale brown solid of activity about 20,000 Units/g. This may be further purified by passing an aqueous solution of it through a suitable molecular sieve chromatography support and by freeze drying the enzyme fraction so obtained to a fine white powder having an activity up to 100,000 Units/g.

The invention will now be described with reference to specific examples thereof. Unless otherwise indicated the percentages are by weight.

EXAMPLE 1

An inoculum was prepared by introducing a selected strain of the organism (*Fusarium fusarioides* I.M.I. No. 158405) into a flask containing an aqueous nutrient medium (5 l) having the following composition:

| Component | % by weight |
| --- | --- |
| Dextran | 3.0 |
| Malt extract (80% solids) | 0.5 |
| Iron "sequestrene" (Geigy) | 0.006 |
| $KH_2PO_4$ | 0.15 |
| $MgSO_4.7H_2O$ | 0.15 |
| KCl | 0.15 |
| Urea | 0.21 |
| Water | to make 100.00 |

The inoculated medium was then stirred magnetically under natural conditions of aeration at a temperate of 30°C for 2 days.

A fermentation tank was then charged with an aqueous nutrient medium (130 l) of the same composition as that given above, and — after steam sterilization — this was inoculated with the above described 2-day old culture. Polypropylene glycol 2000 (Dow), 40 ml, was incorporated in the medium as an antifoaming agent. Fermentation was then allowed to proceed under suitable conditions of aeration, mixing, temperature and pH as described below.

The dissolved oxygen content of the fluid was controlled so as not to fall below 20% of saturation by using a conventional oxygen electrode to control the rate of stirring. Air flow was maintained at 70 l/minute.

The temperature was maintained throughout at 30°C and the pH was prevented from rising above 7.8 by the addition as required of appropriate quantities of sulphuric acid (1.5 M).

After 65 hours it was assessed that a maximum yield of dextranase had been obtained. The aeration was then stopped, the temperature was lowered to about 15°C, and the dextranase was recovered in the supernatant liquid obtained by centrifuging the culture medium. The yield was 126 Units per millilitre of centrifuged culture medium.

The supernatant liquid was then concentrated by reverse osmosis until the concentration of dextranase was about 4,000 Units per millilitre.

EXAMPLE 2

An inoculum was prepared by introducing a selected strain of the organism (*Fusarium fusarioides* I.M.I. No. 158405) into a flask containing an aqueous nutrient medium (5 l) having the following composition:

| Component | % by weight |
| --- | --- |
| Dextran | 3.0 |
| Malt extract (80% solids) | 0.5 |
| Iron "sequestrene" (Geigy) | 0.006 |
| $KH_2PO_4$ | 0.15 |
| $MgSO_4.7H_2O$ | 0.15 |
| KCl | 0.15 |
| Urea | 0.21 |
| Water | to make 100.00 |

The inoculated medium was then stirred magnetically under natural conditions of aeration at a temperature of 30°C for 2 days.

A fermentation tank was then charged with an aqueous nutrient medium (130 l) of the same composition as that given above, and — after sterilization by β-propiolactone (0.45%) — this was inoculated with the above described 2-day old culture. Polypropylene glycol 2000 (Dow), 40 ml, was incorporated in the medium as an antifoaming agent. Fermentation was then allowed to proceed under suitable conditions of aeration, mixing, temperature and pH as described below.

The dissolved oxygen content of the fluid was controlled so as not to fall below 20% of saturation by using a conventional oxygen electrode to control the rate of stirring. Air flow was maintained at 70 l/minute.

The temperature was maintained throughout at 30°C and the pH was prevented from rising above 7.8 by the addition as required of appropriate quantities of sulphuric acid (1.5 M).

After 64 hours it was assessed that a maximum yield of dextranase had been obtained. The aeration was then stopped, the temperature was lowered to about 15°C, and the dextranase was recovered in the supernatant liquid obtained by centrifuging the culture medium. The yield was 225 Units per millilitre of centrifuged culture medium.

The supernatant liquid was then concentrated by reverse osmosis until the concentration of dextranase was about 4,000 Units per millilitre.

EXAMPLE 3 to 7 (and comparative examples)

Various strains (including non-dextranase-producing strains) of the subject organism were incubated at 30°C in wide-mouthed shake flasks (500ml capacity) containing a sterile aqueous nutrient medium (70 ml) as described in Example 1.

To allow for uniform aeration, the flasks were all closed with a uniform large mesh polyurethane foam which retains >99% of particles of >1 micron in diameter. The aeration and mixing were controlled by using a reciprocating shaker operating at 180 strokes per minute and having a stroke length of 5 cm. The flasks were sampled regularly to measure the yield of dextranase. Maximum concentrations of dextranase were found to be achieved in the culture medium within a period of 90 to 283 hours and the yields of activity were found to vary between 1 and 88 Units per millilitre of centrifuged culture medium.

Particular results for the various strains are given in the table below.

| Example | Subject organism | Period (hr) | Activities (Units/ml) |
| --- | --- | --- | --- |
| | *Dactylium fusarioides* | | |
| 3 | A.T.C.C. 14167 | 114 | 73 |
| | AT.C.C. 16568* | 90 | 1 |
| | *Fusarium chlamydosporum* | | |
| 4 | C.B.S. 145.25 | 137 | 44 |
| | *Fusarium fusarioides* | | |
| 5 | I.M.I. 158405 | 283 | 88 |
| | *Fusarium roseum* | | |
| 6 | A.T.C.C. 13379 | 90 | 6 |
| | A.T.C.C. 14717* | 90 | 3 |
| | *Fusarium tricinctum* | | |
| 7 | C.B.S. 261.51 | 138 | 5 |
| | *Gibberella avenacea* | | |
| | A.T.C.C. 18185* | 90 | 2 |

Note:
1. *This denotes a non-dextranase-producing organism as herein defined.
2. In each of the tabulated examples, mixing was effected per medium of the shake flask technique.

The examples could be proliferated (for instance, mutants of the foregoing specifically mentioned strains will produce results of at least an equally satisfactory standard). However, the above is sufficient to illustrate the efficacy of the invention. As the fungus has the characteristics hereinbefore described, and the dextranase-producing strains thereof are determinable in accordance with the nominated assaying method, it will be appreciated that identification of the strains of the invention will pose no problem.

In conclusion, it has been demonstrated by the foregoing description that dextranase can be satisfactorily produced from a fungus previously unkown (and uncontemplated) as a source thereof. Thus, a substantial contribution to the art has been made.

The claims defining the invention are as follows:

1. A method of producing dextranase comprising culturing a dextranase-producing strain of the fungus *Fusarium fusarioides*, or a mutant or variant of said dextranase-producing strain, in a fermentation medium, and recovering the dextranase which accumulates therein.

2. A method of producing dextranase comprising culturing, in a fermentation medium, a dextranase-producing strain of the fungus *Fusarium fusarioides*, or a mutant or variant of said dextranase-producing strain, said strain being selected from the group consisting of *Fusarium fusarioides* I.M.I. No. 158,405, *Dactylium fusarioides* A.T.C.C. No. 14167, *Fusarium chlamydosporum* C.B.S. No. 145.25, *Fusarium roseum* A.T.C.C. No. 13379, and *Fusarium tricinctum* C.B.C. No. 261.51, and recovering the dextranase which accumulates therein.

3. The method of claim 1 wherein culturing is effected by inoculating an aqueous nutrient fermentation medium with germinating spores of the fungus, the culture being incubated under aerated conditions at a predetermined temperature and level of pH.

4. The method of claim 3 wherein the predetermined temperature is in the range of 25°C. to 30°C., the pH is maintained below 7.8, and the aeration rate is such as to maintain in the culture medium a concentration of the dissolved oxygen between 20% and 30% saturation.

5. The method of claim 3 wherein the aqueous nutrient medium is an aerated sterile medium containing sources of assimilable carbon, nitrogen, and minerals.

6. The method of claim 5 wherein the sources of assimilable carbon include, as a dextranase inducer, dextran.

7. The method of claim 2 wherein culturing is effected by inoculating an aqueous nutrient fermentation medium with germinating spores of the fungus, the culture being incubated under aerated conditions at a predetermined temperature and level of pH.

8. The method of claim 7 wherein the predetermined temperature is in the range of 25°C. to 30°C., the pH is maintained below 7.8, and the aeration rate is such as to maintain in the culture medium a concentration of the dissolved oxygen between 20% and 30% saturation.

9. The method of claim 7 wherein the aqueous nutrient medium is an aerated sterile medium containing sources of assimilable carbon, nitrogen, and minerals.

10. The method of claim 4 wherein the aqueous nutrient medium is an aerated sterile medium containing sources of assimilable carbon, nitrogen, and minerals.

11. The method of claim 8 wherein the aqueous nutrient medium is an aerated sterile medium containing sources of assimilable carbon, nitrogen, and minerals.

12. The method of claim 11 wherein the source of assimilable carbon include, as a dextranase inducer, dextran.

13. The method of claim 10 wherein the sources of assimilable carbon include, as a dextranase inducer, dextran.

14. The method of claim 11 wherein the sources of assimilable carbon include, as a dextranase inducer, dextran.

15. The method of claim 2 wherein the strain is *Fusarium fusarioides* I.M.I. No. 158,405.

16. The method of claim 15 wherein culturing is effected by inoculating an aqueous nutrient fermentation medium with germinating spores of the strain, the culture being incubated under aerated conditions at a predetermined temperature and level of pH.

17. The method of claim 16 wherein the aqueous nutrient medium is an aerated sterile medium containing sources of assimilable carbon, nitrogen and minerals.

18. The method of claim 17 wherein the sources of assimilable carbon include, as a dextranase inducer, dextran.

19. The method of claim 2 wherein the strain is *Dactylium fusarioides* A.T.C.C. No. 14167.

20. The method of claim 19 wherein culturing is effected by inoculating an aqueous nutrient fermentation medium with germinating spores of the strain, the culture being incubated under aerated conditions at a predetermined temperature and level of pH.

21. The method of claim 20 wherein the aqueous nutrient medium is an aerated medium containing sources of assimilable carbon, nitrogen and minerals.

22. The method of claim 21 wherein the sources of assimilable carbon include, as a dextranase inducer, dextran.

23. The method of claim 2 wherein the strain is *Fusarium chlamydosporum* C.B.S. No. 145.25.

24. The method of claim 23 wherein culturing is effected by inoculating an aqueous nutrient fermentation medium with germinating spores of the strain, the culture being incubated under aerated conditions at a predetermined temperature and level of pH.

25. The method of claim 24 wherein the aqueous nutrient medium is an aerated medium containing sources of assimilable carbon, nitrogen and minerals.

26. The method of claim 25 wherein the sources of assimilable carbon include, as a dextranase inducer, dextran.

27. The method of claim 2 wherein the strain is *Fusarium roseum* A.T.C.C. NO. 13379.

28. The method of claim 27 wherein culturing is effected by inoculating an aqueous nutrient fermentation medium with germinating spores of the strain, the culture being incubated under aerated conditions at a predetermined temperature and level of pH.

29. The method of claim 28 wherein the aqueous nutrient medium is an aerated medium containing sources of assimilable carbon, nitrogen and minerals.

30. The method of claim 29 wherein the sources of assimilable carbon include, as a dextranase inducer, dextran.

31. The method of claim 2 wherein the strain is *Fusarium tricinctum* C.B.C. No. 261.51.

32. The method of claim 31 wherein culturing is effected by inoculating an aqueous fermentation medium with germinating spores of the strain, the culture being incubated under aerated conditions at a predetermined temperature and level of pH.

33. The method of claim 32 wherein the aqueous nutrient medium is an aerated medium containing spores of assimilable carbon, nitrogen and minerals.

34. The method of claim 33 wherein the sources of assimilable carbon include, as a dextranase inducer, dextran.

* * * * *